Oct. 30, 1956 D. C. DAVIS ET AL 2,769,084

EQUALIZED FAST TIME CONSTANT SYSTEM

Filed Jan. 11, 1951 3 Sheets-Sheet 1

DONOVAN C. DAVIS
ROBERT M. TRYON
INVENTORS

BY Lyon & Lyon

ATTORNEYS

EQUALIZED FAST TIME CONSTANT SYSTEM

Filed Jan. 11, 1951 3 Sheets-Sheet 2

DONOVAN C. DAVIS
ROBERT M. TRYON
INVENTORS

BY Lyon & Lyon

ATTORNEYS

EQUALIZED FAST TIME CONSTANT SYSTEM

Filed Jan. 11, 1951 3 Sheets-Sheet 3

DONOVAN C. DAVIS
ROBERT M. TRYON
INVENTORS

BY Lyon & Lyon
ATTORNEYS

United States Patent Office 2,769,084

Patented Oct. 30, 1956

2,769,084

EQUALIZED FAST TIME CONSTANT SYSTEM

Donovan C. Davis, South Pasadena, and Robert M. Tryon, Lynwood, Calif., assignors to Gilfillan Bros., Inc., Los Angeles, Calif., a corporation of California Application January 11, 1951, Serial No. 205,578

9 Claims. (Cl. 250—20)

The present invention relates to improved techniques useful in radar receivers which incorporate circuitry for selectively distinguishing pulses of predetermined duration and for preventing the loss of a weak desired received signal which otherwise might be lost in the "shadow" of a strong received preceding signal; and, in particular to a compensating arrangement whereby the sensitivity of the radar receiver is maintained substantially the same regardless of whether or not such circuitry is switched in or whether it is switched out, and whether or not a selected one of a plurality of circuits of different time constants are used for this purpose.

In general, the present invention contemplates the provision of improved means whereby video signals are made to have a substantially constant predetermined amplitude to produce a display with substantially the same intensity on a cathode ray tube regardless of which one of a plurality of fast time constant circuits the video signals are required to be passed through.

In the prior art practice, such as exemplified in the copending application of Robert M. Tryon, one of the applicants herein, namely, application Serial No. 181,729, filed August 28, 1950, Patent No. 2,698,914, granted January 4, 1955, for Fast Time Constant Circuit With Clipping Diode, and assigned to the same assignee as the present invention, fast time constant circuits, hereinafter referred to as FTC circuits, have been used in systems employing cathode ray tubes to effect an apparent reduction of target echo pulse duration. These FTC circuits are essentially high frequency peaking video circuits. In such prior art practice, the resulting high frequency video signals have their amplitudes or intensity diminished in different amounts, depending upon which one of a plurality of FTC circuits the video signal is required to pass through; and as a consequence, when and as different FTC circuits are switched in the resulting intensity of illumination of the cathode ray tube is changed markedly to produce undesirable contrasting effects and to render measurements inaccurate.

It is an object of the present invention to provide an improved technique and means whereby the amplitude or intensity of indication produced by radar signals are substantially the same regardless of whether or not the video is required to pass through no FTC circuit or wheher the video is required to pass through a selected one of a plurality of FTC circuits.

A specific object of the present invention is to provide an improved radar receiver which may incorporate either one or more of a plurality of fast time constant circuits of the type described in the aforementioned copending application with the resulting indication on the cathode ray tube being of the same intensity regardless of which one of such circuits is used.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 shows in schematic block diagram form a radar receiver embodying features of the present invention;

Figure 2 shows in more detail, but in schematic form, a portion of the apparatus shown in Figure 1, this figure showing the last intermediate frequency amplifier of a heterodyne radar receiver, the detector stage, the means for equalizing the output of the several FTC circuits, one of which is to be chosen, the FTC circuits themselves, a means for selecting a particular FTC circuit, and a video amplifier;

Figure 2:
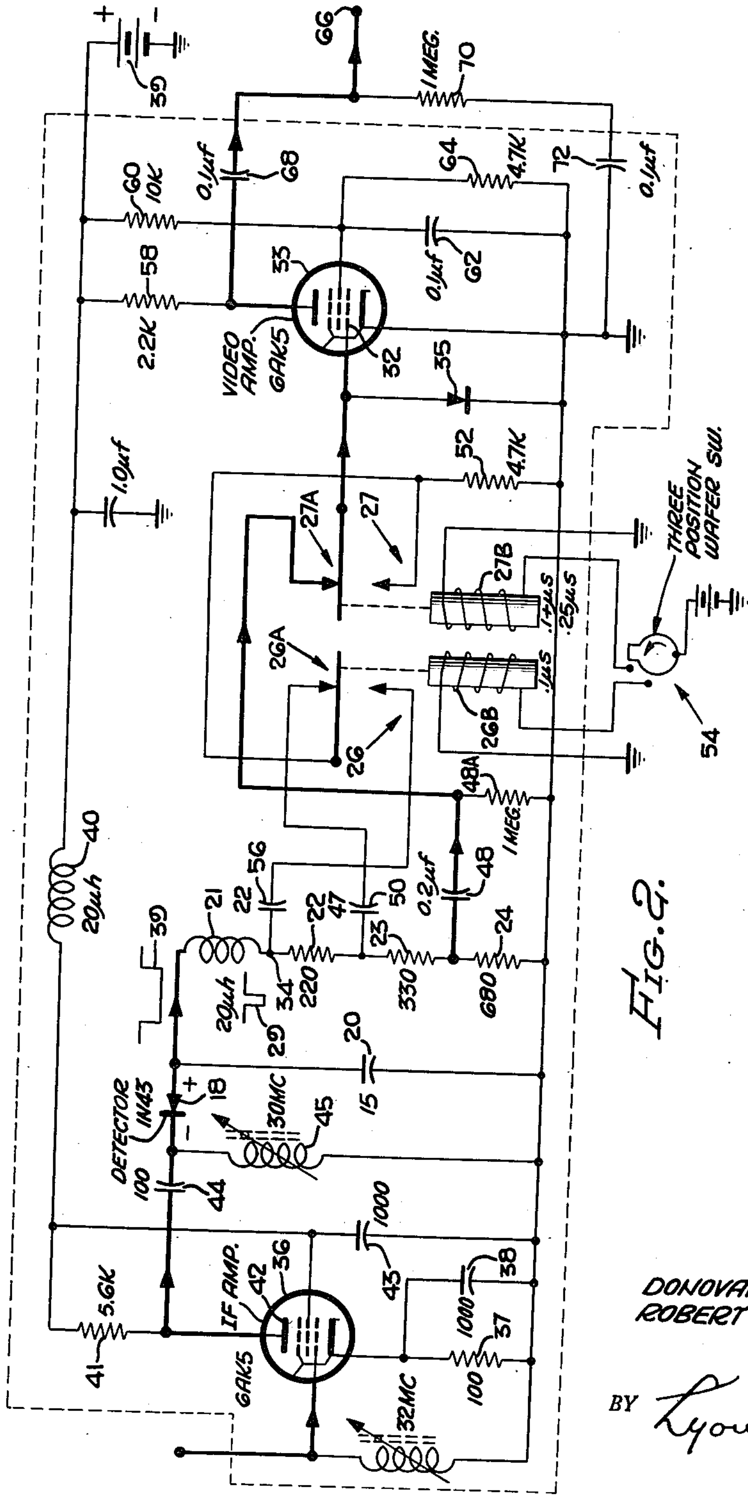
Figure 1:
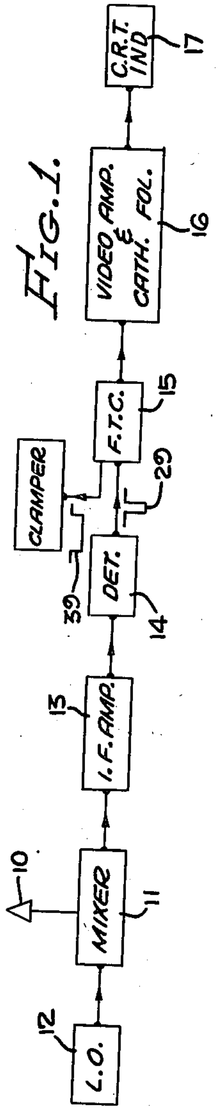

Referring to Figures 1 and 2, both desired echo radar signals 29 and undesired sporadic signals 39, "rain" or "cloud clutter," as well as large intensity signals from mountains and the like, are received in the form of carrier waves on antenna 10 and mixed in mixer stage 11 with a signal of constant frequency developed in the local oscillator stage 12, to thereby produce, by superheterodyne action, a wave of intermediate frequency which is amplified in the I. F. amplifier stage 13, detected in the detector stage 14, and the resulting video, including such signals 29 and 39, after being subjected to the fast time constant network 15 is amplified in the video amplifier 16 and then applied to the cathode ray indicator 17.

The signal of intermediate frequency is detected by means of the crystal detector 18 (Figure 2) and its associated components, i. e., the capacitor 20 and inductor 21. The output of the detector is then applied to a potentiometer consisting of series-connected resistors 22, 23, and 24. By means of these connected resistors and suitable switching described hereinafter, various amplitudes of the available video signal may be selected and applied to three different circuits, each of different time constant, such circuits being shown in Figures 3, 4 and 5.

Figure 4:
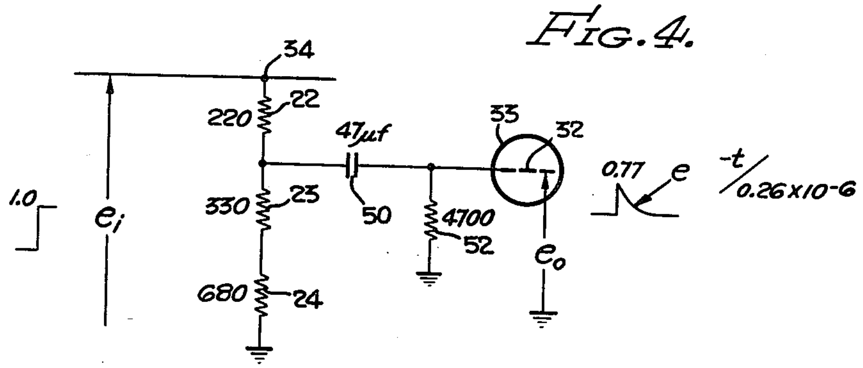
Figure 4 shows in schematic form elements of the circuit shown in Figure 2 conditioned to impose one of the FTC circuits in the path of the video signals.
Figure 5:
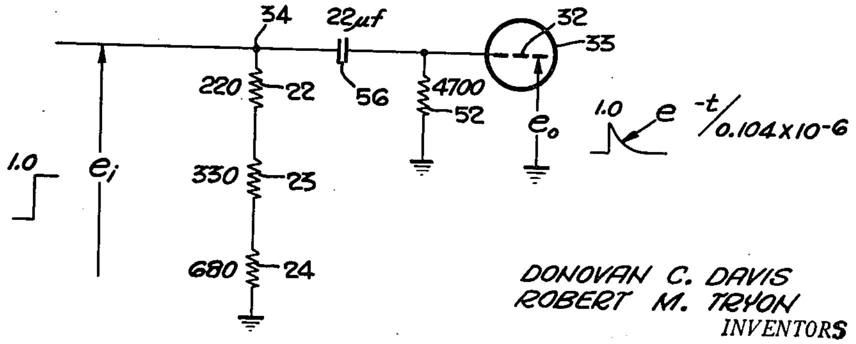
Figure 5 shows in schematic form the components of the circuit shown in Figure 2 conditioned to impose a second type of fast time constant circuit in the path of the video signals.

In general, the particular one of the three coupling circuits which may be used depends upon the energized state of the relays 26 and 27. Briefly, if neither relay 26 nor 27 is energized, video is aplied to the grid 32 of tube 33 as normal video by means of the coupling circuit illustrated in Figure 3 having a time constant of 0.2 second, with the peak amplitude 0.56 times that of the input signal appearing at the junction point 34 of inductance 21 and resistance 22; when relay 27 is energized and relay 26 is deenergized, then video is applied to the grid 32 of the electron tube 33 by means of a circuit illustrated in Figure 4 of time constant equal to 0.266 microsecond, with a resulting peak amplitude of the video 0.77 times that of the video appearing at the junction point 34; and, when both relays 26 and 27 are energized, signal is applied to the grid 32 of tube 33 by means of a circuit illustrated in Figure 5 of time constant 0.131 microsecond, with the peak amplitude of the video the same as that appearing at the junction point 34. The signal input thus selectively applied to the grid 32 of electron tube 33 is the arrangements shown in Figures 4 and 5 is essentially high-frequency-peaked video, or video from which the low frequencies have been removed. By means of the crystal rectifier 35 the negative values of videos so produced, which are associated with the decreasing aspect or fall-time of normal video, are eliminated.

More specifically, in Figure 2 the intermediate frequency amplifier tube 36 has its cathode grounded through the resistance 37 with a bypass condenser 38 in parallel with such resistor. The anode of device 36 is supplied with space current from the positive terminal of voltage source 39 which has its positive ungrounded terminal connected through inductance 40 and resistance 41 to the anode 42. The screen of tube 36 is connected to the junction point of the inductance 40 and resistance 41 and is bypassed to ground by means of the condenser 43. The anode of the amplifier tube 36 is coupled by means of the coupling condenser 44 to one terminal of the self-resonant inductance coil 45 and to the negative terminal of the detector, i. e., germanium crystal 18, the other terminal of the self-resonant coil 45 being grounded and the other positive terminal of the detector 18 being connected to ground through the condenser 20. Such positive terminal of the detector 18 is also connected to ground through a series circuit which comprises the inductance coil 21 and resistances 22, 23 and 24. These resistances have the magnitudes indicated in the drawing, i. e., 220, 330 and 680 ohms, respectively.

The voltage thus appearing across these resistances 22, 23, 24 which, in fact, provide a voltage divider, may be applied in different proportions to the control grid 32 of the video amplifier tube 33, in an amount depending upon the energized condition of the relays 26 and 27. These relays 26 and 27 are shown in their normal deenergized condition in Figure 2; and, in such normal condition the circuit shown in simplified form in Figure 3 results. In such normal condition, the voltage appearing at the junction point of resistances 23 and 24 is coupled through coupling condenser 48 to the control grid 32, through the normally closed portion of the single pole double throw relay switch 27A with the resistance 48A connected between the grid 32 and ground. In this normal condition it is observed that the condenser 50 which, in this particular condition, is serially connected with the resistance 52, is in shunt with the resistances 23 and 24, but since such condenser 50 is of low magnitude and the resistance 53 is of relatively high magnitude, its shunting effect on the serially connected resistances 23 and 24 may for present intents and purposes be neglected.

Figure 3:
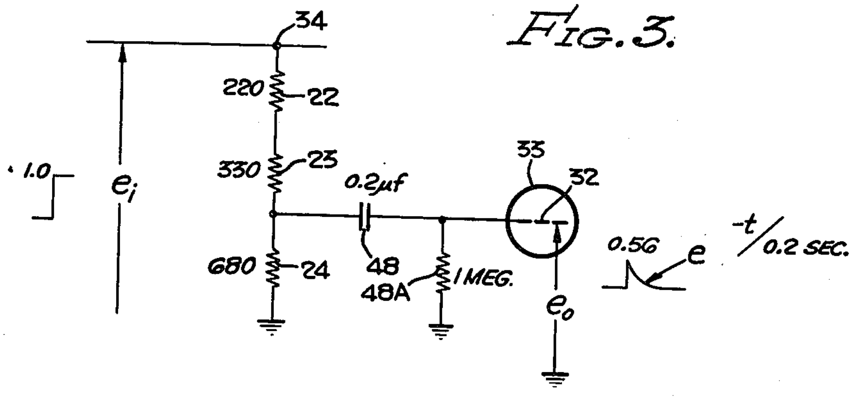
Figure 3 shows in schematic form components of the circuit shown in Figure 2 when it is conditioned so that the video is subjected to substantially no FTC action with the coupling circuit having a time constant in the order of 0.2 second.

Thus, in this normal condition, i. e., the condition represented in Figure 3, a voltage having amplitude equal substantially to 0.56 times the amplitude of the detected video voltage appearing at the junction point 34 is applied to the control grid 32 through a circuit which has a relatively large time constant circuit, i. e., one which is substantially devoid of fast time constants effects, the time constant being in the order of 0.2 second.

The relays may be controlled by the three-position switch 54 so that in the first position of the switch 54 shown in Figure 2 neither relay winding 26B nor winding 27B is energized, i. e., the normal condition is realized; in a second position of the switch only relay winding 27B is energized; and, in the third position of the switch both relay windings 26B and 27B are energized to achieve respectively the conditions shown in Figures 4 and 5. In the second position of the switch, i. e., with relay winding 27B energized, the voltage appearing at the junction point of resistances 22 and 23 is applied through condenser 50, the normally closed portion of the single pole double throw relay switch 26A and the normally open portion of relay switch 27A to the video amplifier control grid.

In the third position of the switch, i. e., when relay windings 26B and 27B are each energized, the voltage appearing at the junction point 34 is applied to condenser 56, normally open portion of relay switch 26A and normally open portion of relay switch 27A to the control grid 32 of the video amplifier 33 to achieve the condition indicated in Figure 5, wherein the amplitude has a relative magnitude of one, with the video applied through a circuit having a time constant in the order of 0.131 microsecond.

From a study of Figures 3, 4 and 5, it is noted that the shorter the time constant through which the video is applied, the greater must be the amplitude to accomplish the same general effect on the cathode ray tube, and therein lies an important concept of the present invention.

The tube 33 is otherwise connected as a video amplifier with the cathode of tube 33 grounded and the anode connected to the positive terminal of voltage source 39 through the resistance 58. The screen grid of tube 33 is connected to the junction point of resistances 60 and 64, which are serially connected across the voltage source 39, and the bypass condenser 62 is connected in parallel with the resistance 64. The amplified voltages appearing on the anode of tube 33 are transferred to the output terminal 66 through the coupling condenser 68, such output terminal 66 being connected to ground through the serially connected resistance 70 and condenser 72.

Figure 6:
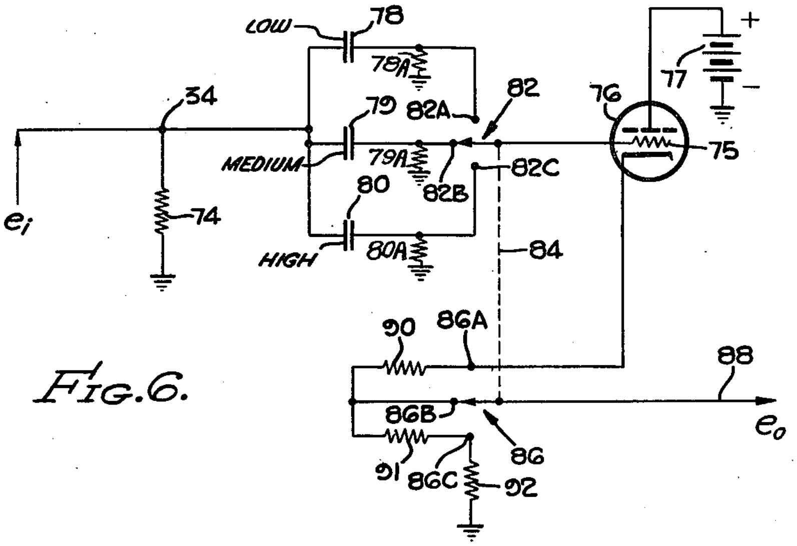
Figure 6 shows in schematic form an alternative means for equalizing the FTC output of a radar receiver.

Figure 6 shows a modified arrangement for the same general purposes described above, and the junction point 34 therein is the same junction point 34 represented in Figure 2, and the single resistance 74 therein is equivalent to the serially connected resistances 22, 23, 24 in Figure 2. The video signal thus appears across the resistance 74, and such video signal is applied, through one of three different circuits, to the control grid 75 of the cathode follower tube 76 having its anode connected directly to the positive terminal of voltage source 77. The junction point 34 is connected to one terminal of each of the condensers 78, 79 and 80, and the control grid 75 is selectively connected to the other terminal of either condenser 78, 79 or 80, depending upon the position of the three-position single pole switch 82, which is ganged as indicated by the dotted line 84 to a second single pole three-position switch 86. It is observed that such other terminal of condensers 78, 79 and 80 is returned to ground respectively through resistances 78A, 79A and 80A. The position of the switch 86 determines the peak of the signal appearing on the output lead 88. The cathode of the tube 76 is at all times connected to ground through the three serially connected resistances 90, 91 and 92, which provide a voltage dividing circuit connected to such switch 86.

The position of the ganged switches 82 and 86 corresponds to the condition set forth in Figure 4, and in such case the condenser 79 is of medium value, whereas the condenser 78 has a relatively low magnitude and the condenser 80 has a relatively high magnitude. In such case, when the movable switch elements of switches 82, 86 engage the contacts 82A and 86A, respectively, a relatively short time constant circuit is connected to the control grid 75 but a relatively large peak voltage appears on the output lead 88; thus corresponding to the condition set forth in Figure 5. In the position of the switches 82 and 86 shown in Figure 6, wherein the contacts 82B and 86B are engaged, a circuit of medium time constant is connected to the control grid 75 and an intermediate value of peaked voltage appears on the output lead 88; thus corresponding to the condition set forth in Figure 4; and, when the contacts 82C and 86C are engaged, a relatively long time constant circuit is connected to the control grid 75 and a relatively small peaked voltage output appears on the output lead 88; thus corresponding to the condition set forth in Figure 3. The output lead 88 may be connected to a succeeding stage of video amplification similar to the stage 33 in Figure 2.

Figure 7:
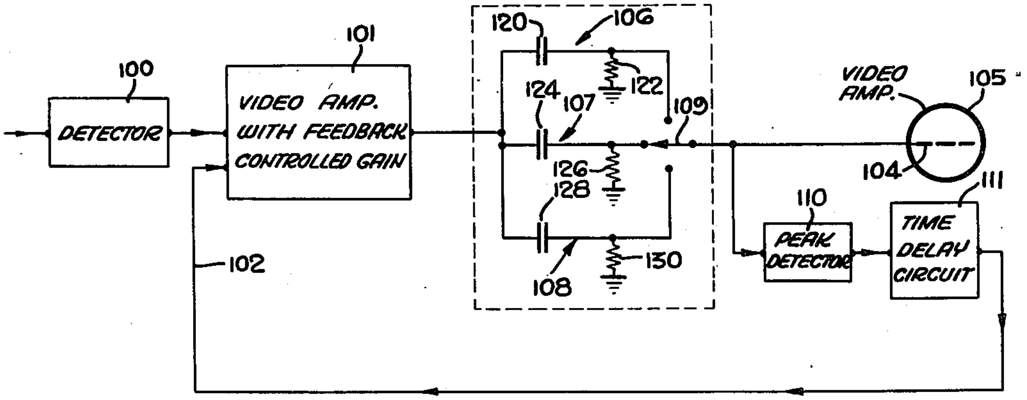
Figure 7 shows a block diagram of modified apparatus whereby another method of equalizing the FTC output may be realized.

The modified arrangement shown in Figure 7 includes a feedback circuit for accomplishing the general purpose described above. In such case the output of the detector stage 100 is applied to a feedback amplifier stage with feedback controlled gain 101. This stage includes conventional variable mu tubes which control the gain of the amplifier stage 101 in accordance with the continuous potential existing on the automatic gain control line 102. The output of the video amplifier stage 101 is impressed upon the control grid 104 of the succeeding video amplifier 105 after being subjected to one of the three time constant circuits 106, 107, 108, determined by the position of the three-position single pole switch 109. The movable element of the switch 109 is connected to the input of the peak detector stage 110, the output of which is applied to the lead 102 after passing through a conventional time delay circuit 111. The continuous potential thus established on the lead 102 serves to control the amplification in stage 101, so that the average voltage level on the control grid 104 remains the same regardless of the position of the switch 109, i. e., regardless of which one of the time constant circuits 106, 107, 108 is switched into such control grid circuit. The time constant of circuit 106 is determined, of course, by the values of the serially connected condenser 120 and shunt connected resistance 122; the time constant of the circuit 107 is determined by the magnitude of the serially connected condenser 124 and shunt connected resistance 126; and the time constant of circuit 108 is determined by the magnitude of the serially connected condenser 128 and shunt connected resistance 130. Thus, the time constant of the circuit 106 may have a magnitude of two-tenths of a second; the time constant of the circuit 107 may be 0.26 microsecond; and the time constant of circuit 108 may be 0.104 microsecond. It is noted that the peak detector and time delay circuits 110, 111 comprise an integrating circuit to establish an average value of voltage on the feedback line 102, so that the potential on such line is not dependent upon any one particular pulse applied to the control grid 104, but to a long time effect produced by the long series of such pulses.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In a receiving system of the character described wherein undesired signals may interfere with the reception of desired signals of relatively short duration, the combination comprising: a detector stage effective to separate said undesired and desired signals from a received wave, a plurality of circuits of different attenuation and of different time constants commensurate with the duration of the desired signals to differentiate each of said undesired signals and to produce therefrom two peaked signals of opposite polarity in each of said circuits, switching means for interconnecting one of said plurality of circuits to said detector stage and for connecting said one circuit to a signal utilization means, said switching means being effective to apply different intensities of voltage derived in said detector stage to different ones of said plurality of circuits, said signal utilization means comprising a cathode ray tube, each of said plurality of circuits being so adjusted whereby the signal from said detector stage applied to said cathode ray tube produces substantially the same intensity of indication thereon regardless of the particular circuit which is connected thereto by said switching means.

2. In a receiving system of the character described wherein it is desired to identify desired signals of relatively short duration in relationshop to contemporaneously received undesired signals, a detector stage effective to separate said undesired and desired signals from a received wave, a signal utilization means including an indicator, a plurality of circuits each of different time constants and of different attenuation, and switching means effective to interconnect one of said plurality of circuits between said detector stage and said signal utilization means, said circuits having such attenuation and such time constant that the signal from said detector stage is applied to said signal utilization means to produce substantially the same intensity of indication on said indicator regardless of the particular circuit interconnected thereby.

3. A receiving system according to claim 2 in which said plurality of circuits are a plurality of differentiating networks.

4. In a receiving system of the character described wherein undesired signals of relatively long duration may interfere with the reception of desired signals of relatively short duration, the combination comprising: a detector stage effective to separate said undesired and desired signals from a received wave, a signal utilization means including an indicator, a plurality of networks of different time constants and of different attenuation each connectible to the output circuit of said detector stage, switching means to connect one of said plurality of networks with the output circuit of said detector stage, and means effective to transfer the voltage developed in said output circuit of said detector stage through one of said networks to said utilization means to produce substantially the same intensity of indication on said indicator regardless of the particular network connected to said output circuit.

5. A system as set forth in claim 4 including a plurality of selectable attenuating means for attenuating the signal transferred to said utilization means, and second switching means operated jointly with the first-mentioned switching means for selecting one of said attenuating means.

6. In a receiving system of the character described wherein undesired signals of relatively long duration may interfere with the reception of desired signals of relatively short duration, the combination comprising: a detector stage effective to separate said undesired and desired signals from a received wave, a signal utilization means including an indicator, a plurality of serially connected resistances across the output circuit of said detector stage, a plurality of networks of different time constants connectible between corresponding terminals of said serially connected resistances and said utilization means, and switching means effective to connect a corresponding one of said networks to a corresponding resistance terminal, each of said plurality of networks being so adjusted whereby the signal from said detector stage applied to said utilization means produces substantially the same intensity of indication on said indicator regardless of the particular network which is connected thereto by said switching means.

7. A system as set forth in claim 4 including a cathode follower stage coupled between said one of said plurality of networks and said utilization means, said cathode follower stage having a plurality of selectable attenuating means in its output circuit for attenuating the signal transferred to said utilization means, and second switching means operated jointly with the first-mentioned switching means for selecting one of said attenuating means.

8. A system as set forth in claim 4 in which a variable gain amplifier serves to connect said detector stage with said one of said plurality of networks, and means automatically controlling the gain of said amplifier in accordance with the peak intensity of the signal appearing at the output of said one network.

9. A system as set forth in claim 4 in which a variable gain amplifier serves to connect said detector stage with said one of said plurality of networks, means automatically controlling the gain of said amplifier in accordance with the peak of said intensity of the signal appearing at the output of said one network, the last-mentioned means including a peak detector stage connected to the output of the selected network, and a time delay circuit coupling said peak detector stage to said variable gain amplifier.

References Cited in the file of this patent

UNITED STATES PATENTS

| | | |
|---|---|---|
| 2,245,569 | Cattel | June 17, 1941 |
| 2,287,926 | Zepler | June 30, 1942 |
| 2,308,375 | Loughren | Jan. 12, 1943 |
| 2,355,363 | Christaldi | Aug. 8, 1944 |
| 2,410,736 | Hoisington | Nov. 5, 1946 |
| 2,446,244 | Richmond | Aug. 3, 1948 |
| 2,501,769 | Frommer | Mar. 28, 1950 |
| 2,510,983 | Krause | June 13, 1950 |
| 2,609,496 | Wheeler | Sept. 2, 1952 |